United States Patent
Maria

(10) Patent No.: US 9,906,366 B1
(45) Date of Patent: Feb. 27, 2018

(54) SERVICE PROVIDER BASED SECURITY IN A WIRELESS NETWORK

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/481,814

(22) Filed: Apr. 7, 2017

(51) Int. Cl.
| H04M 1/66 | (2006.01) |
| H04L 9/32 | (2006.01) |
| H04L 29/06 | (2006.01) |
| H04W 12/08 | (2009.01) |
| H04W 12/12 | (2009.01) |
| H04L 9/06 | (2006.01) |

(52) U.S. Cl.
CPC ........... *H04L 9/3231* (2013.01); *H04L 9/065* (2013.01); *H04L 29/06809* (2013.01); *H04L 63/0245* (2013.01); *H04L 63/0457* (2013.01); *H04L 63/0876* (2013.01); *H04W 12/08* (2013.01); *H04W 12/12* (2013.01)

(58) Field of Classification Search
CPC ....... H04L 12/06; H04L 63/08; H04L 63/105; H04L 63/20; H04L 63/0869; H04L 63/062; H04L 63/0442; H04L 63/0428; H04L 67/12; H04L 69/08; H04L 67/2823; H04L 63/10; H04W 12/08; H04W 12/12; H04W 24/00; H04W 24/10
USPC ........ 455/410, 411, 406, 418; 726/19; 380/2
See application file for complete search history.

(56) References Cited

U.S. PATENT DOCUMENTS

| 6,724,913 | B1 | 4/2004 | Chen et al. | |
| 7,260,722 | B2 * | 8/2007 | Forstrom | G06T 1/0021 380/202 |
| 7,617,542 | B2 * | 11/2009 | Vataja | G06F 21/10 340/995.28 |
| 8,190,901 | B2 | 5/2012 | Barr et al. | |
| 8,200,818 | B2 * | 6/2012 | Freund | H04L 63/0263 709/203 |
| 8,345,316 | B2 * | 1/2013 | Bradley | G06T 1/0028 358/3.28 |
| 8,458,481 | B2 * | 6/2013 | Zhang | H04L 63/126 380/202 |

(Continued)

FOREIGN PATENT DOCUMENTS

| DE | 10204613 A1 * | 8/2003 | ........... H04L 63/126 |
| WO | WO 2005041475 A1 * | 5/2005 | ......... H04L 63/0227 |

*Primary Examiner* — Mahendra Patel
(74) *Attorney, Agent, or Firm* — King & Spalding LLP

(57) ABSTRACT

A service provider based security system of a cellular network includes a security device that is deployed in the cellular network. The security device receives and monitors cellular network traffic to identify a data packet of the cellular network traffic that is associated with a graphics protocol. Responsively, the security device creates a digital fingerprint using unique service provider specific information and/or a portion of the data packet. The security device encrypts the digital fingerprint. Further, the encrypted digital fingerprint is embedded in a header of the identified data packet and/or stored in a database coupled to the security device for further access by authorized users. Additionally, the security device determines a security action that is to be executed in association with the identified data packet.

19 Claims, 5 Drawing Sheets

(56) References Cited

U.S. PATENT DOCUMENTS

| | | |
|---|---|---|
| 8,804,737 B2 | 8/2014 | Jacobson et al. |
| 8,848,969 B2 | 9/2014 | Ramsdell et al. |
| 9,066,157 B2 | 6/2015 | Jin et al. |
| 9,497,349 B2 | 11/2016 | Martin |
| 2001/0027521 A1* | 10/2001 | Cromer .................. H04L 29/06 713/191 |
| 2002/0186845 A1* | 12/2002 | Dutta ................ G06F 17/30017 380/231 |
| 2003/0200439 A1* | 10/2003 | Moskowitz ........ G06Q 30/0601 713/176 |
| 2004/0005078 A1 | 1/2004 | Tillotson |
| 2005/0091367 A1 | 4/2005 | Pyhalammi et al. |
| 2006/0156009 A1* | 7/2006 | Shin ..................... H04L 63/123 713/176 |
| 2006/0242418 A1 | 10/2006 | Williamowski et al. |
| 2007/0074035 A1 | 3/2007 | Scanlon et al. |
| 2017/0093826 A1* | 3/2017 | Werneyer ............ G06F 21/6218 |

\* cited by examiner

SERVICE PROVIDER BASED SECURITY IN A WIRELESS NETWORK

TECHNICAL FIELD

Embodiments of the present disclosure relate generally to communication networks, and more particularly to a system, apparatus, and method for service provider based security in a wireless network, such as a cellular network.

BACKGROUND

The evolution of cellular network technology and the rapid proliferation of mobile computing devices, such as smart phones, tablets, etc., with Internet access capability have resulted in an increased flow of Internet traffic (herein "traffic") over cellular networks. Further, it is observed that much of the traffic is graphics oriented, in other words, a substantial portion of the traffic includes data packets transporting graphics data. In some instances, the graphics data transmitted over the cellular networks may include undesirable content, such as malware or viruses, or the traffic may be corrupted or altered during transmission. Service providers, also known as cellular network carriers, that control and/or operate the cellular networks may have the capability to access and/or view said traffic that flows through their respective cellular networks, thereby, enabling them to provide various service provider based security services. However, existing service provider technology and/or infrastructure is limited in the ability to provide security services in cellular networks.

SUMMARY

The present disclosure provides a system, apparatus, and/or method that addresses the above-mentioned deficiencies of the existing service provider technology and/or infrastructure by providing a cellular network security device. In particular, the security device of the present disclosure provides a technical solution to a technical problem that is rooted in computer communication technology, i.e., securing and tracking traffic through a cellular network originating from an endpoint device and/or transmitted to an endpoint device for improving data integrity, quality of service, and security of data, e.g., graphics data, transmitted over the cellular network.

In one example, the security device is deployed in a service provider portion of the cellular network such that the security device can monitor network traffic that enters, flows through, and/or exits the service provider core network of the cellular network. For example, the security device may be disposed in between a radio access network and the service provider core network. Alternatively, in other examples, the security device may be disposed inside the service provider core network. Further, the security device is communicably coupled to a supporting database and/or a repository of actions database. The supporting database may comprise information regarding each subscriber (or roaming user) of the cellular network, and security action items associated with each subscriber. Further, the repository of actions database may store any appropriate actions that are requested and completed on behalf of the subscriber as will be described below. The repository of actions database may be accessible to authorized provisioning and information retrieval systems of the service provider, law enforcement agencies, or other authorized third parties.

In the example, the security device receives cellular network traffic and inspects the received network traffic to identify a data packet transporting graphics data, such as, a JPEG file, a GIF file, etc. Upon identifying the data packet transporting graphics data, the security device creates a digital fingerprint associated with the identified data packet by cryptographically combining at least a portion of the identified data packet and/or unique service provider specific information. The unique service provider specific information may include information associated with the transmission of the data packet that is uniquely available to the service provider, e.g., information created and/or assigned by the service provider. The service provider specific information may be retrieved from a signaling and mobility control element of the cellular network, a subscriber database, such as a home subscriber server (HSS) database of the cellular network, and/or the supporting database that is communicably coupled to the security device. Once the digital fingerprint is created, the security device encrypts the digital fingerprint. The encrypted digital fingerprint is then embedded in a header portion of the data packet and/or stored in the repository of actions database (and/or the supporting database).

The digital fingerprint that is embedded in the data packet allows other downstream network elements or backend servers to determine if the data packet and/or the graphics data transported by the data packet have been altered, and thereby, improve a quality of service of the data transmission over the cellular network. The digital fingerprint that is stored in the repository of actions database can also be used for said determination and validation that the data packet transporting the graphics data is indeed authorized, has been transmitted through the cellular network operated by the service provider, and has not been altered. Further, storing the digital fingerprint comprising the service provider specific information in the repository of actions database enables tracking the source and/or destination of a data packet at a later time, e.g., by law enforcement agencies. For example, law enforcement agencies may be able to identify the individual that sent and/or received the graphics oriented data packet, the specific phone used by the sender and/or receiver, the location and time of transmission, and so on.

In addition to creating the digital fingerprint, the security device operates in concert with the supporting database to identify a security action that is to be taken responsive to identifying the graphics oriented data packet based on the rules that are stored in the supporting database. For example, a rule associated with a subscriber and stored in the supporting database may instruct the security device to block all graphics oriented data packets sent to or from the subscriber. Alternatively, the rules may instruct the security device to generate an alert to a law enforcement agency responsive to receiving a data packet transporting a specific type of graphics. Additionally, the security device may include a machine learning algorithm that enables the security device to learn specific patterns of graphics, information regarding the sender, information regarding the receiver, etc., and automatically determine the security actions to be performed based on the type of graphics, the sender, the receiver, and/or other appropriate factors.

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
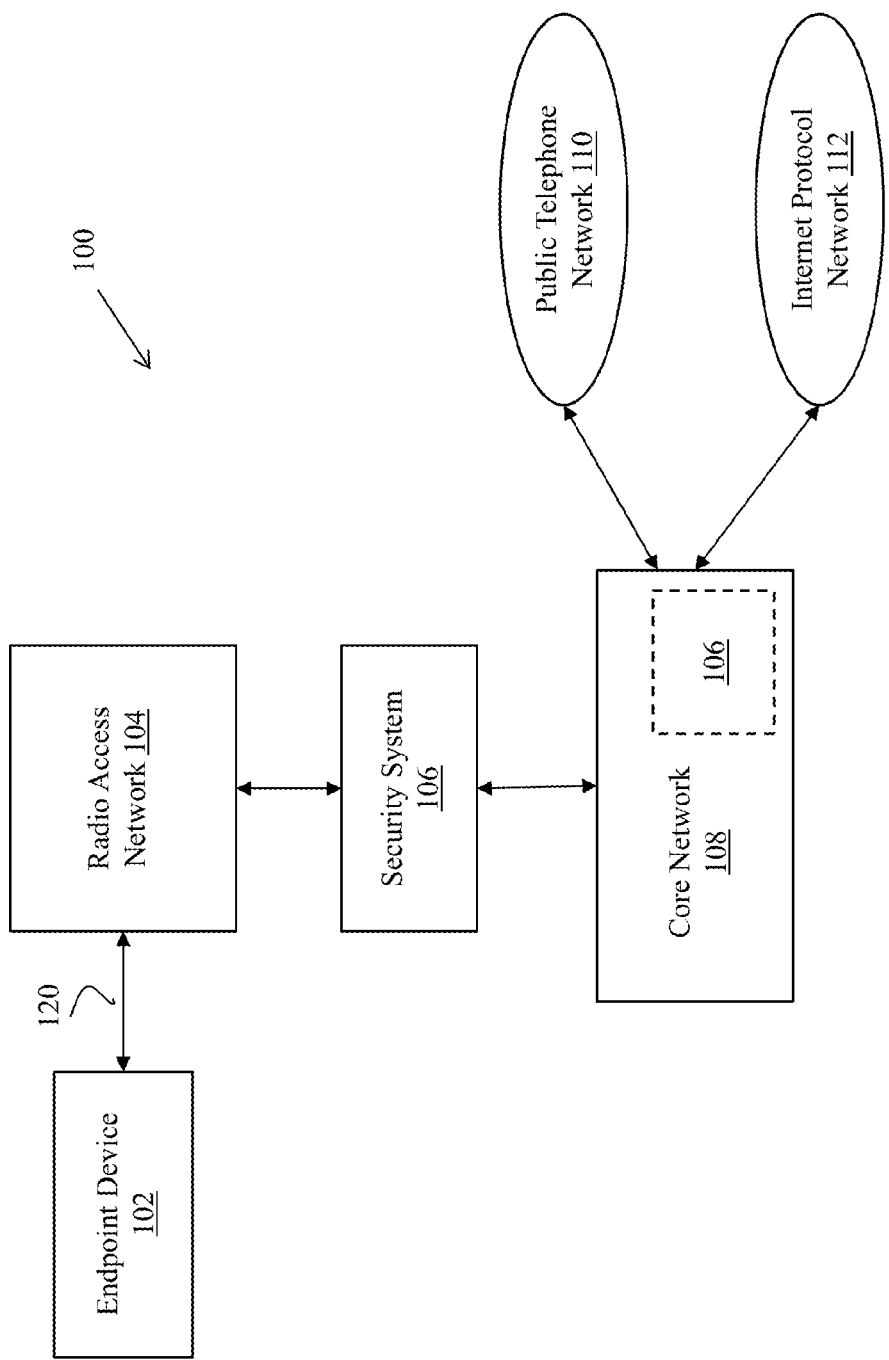
FIG. 1 illustrates an example operating environment of a service provider based security system, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments.

DETAILED DESCRIPTION OF EXAMPLE EMBODIMENTS

In the following paragraphs, a system, apparatus, and method for service provider based security in a wireless network, e.g., a cellular network, will be described in further detail by way of examples with reference to the attached drawings. In the description, well known components, methods, and/or processing techniques are omitted or briefly described so as not to obscure the disclosure. Further, as used herein, the "present disclosure" refers to any one of the embodiments of the disclosure described herein and any equivalents. Furthermore, reference to various feature(s) of the "present disclosure" is not to suggest that all embodiments must include the referenced feature(s) or that all embodiments are limited to the referenced feature(s).

The service provider based security system (herein "security system") described herein may include a set of security elements residing in a service provider portion of a cellular network. The security elements may include a security device, a supporting database, and a repository of actions database that are communicably coupled to each other. The security device may operate in concert with the supporting database and the repository of actions database to monitor cellular network traffic, identify data packets in the cellular network traffic that transport graphics data, create and encrypt a digital fingerprint for the identified data packets, and store the encrypted digital fingerprint.

The digital fingerprint associated with each identified data packet may include at least a portion of the identified data packet and unique service provider specific information associated with the transmission of the identified data packet, the sender and/or receiver of the identified data packet, the endpoint device of the sender and/or receiver, and/or other appropriate information. The encrypted digital fingerprint may be embedded in the header portion of the identified data packet and/or stored in the repository of actions database and/or the supporting database. Additionally, the security device may operate in concert with the supporting database to execute one or more security actions associated with each identified data packet transporting graphics data. The executed security actions may also be stored in the repository of actions database along with information associated with transmission of the data packet transporting graphics data, such as when the data packet was transmitted, to whom, responses received, etc. The repository of actions database may be accessible by authorized third parties, such as a law enforcement agencies, analysis entities, etc.

Technology associated with the system, apparatus, and method for service provider based security in a wireless network will now be described in greater detail with reference to FIGS. 1-5. First, FIGS. 1-2 will be discussed in the context of describing an example operating environment associated with the security system according to certain exemplary embodiments of the present disclosure. Then, FIGS. 3-5 will be discussed, making exemplary reference back to FIGS. 1-2 as needed.

It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 2:
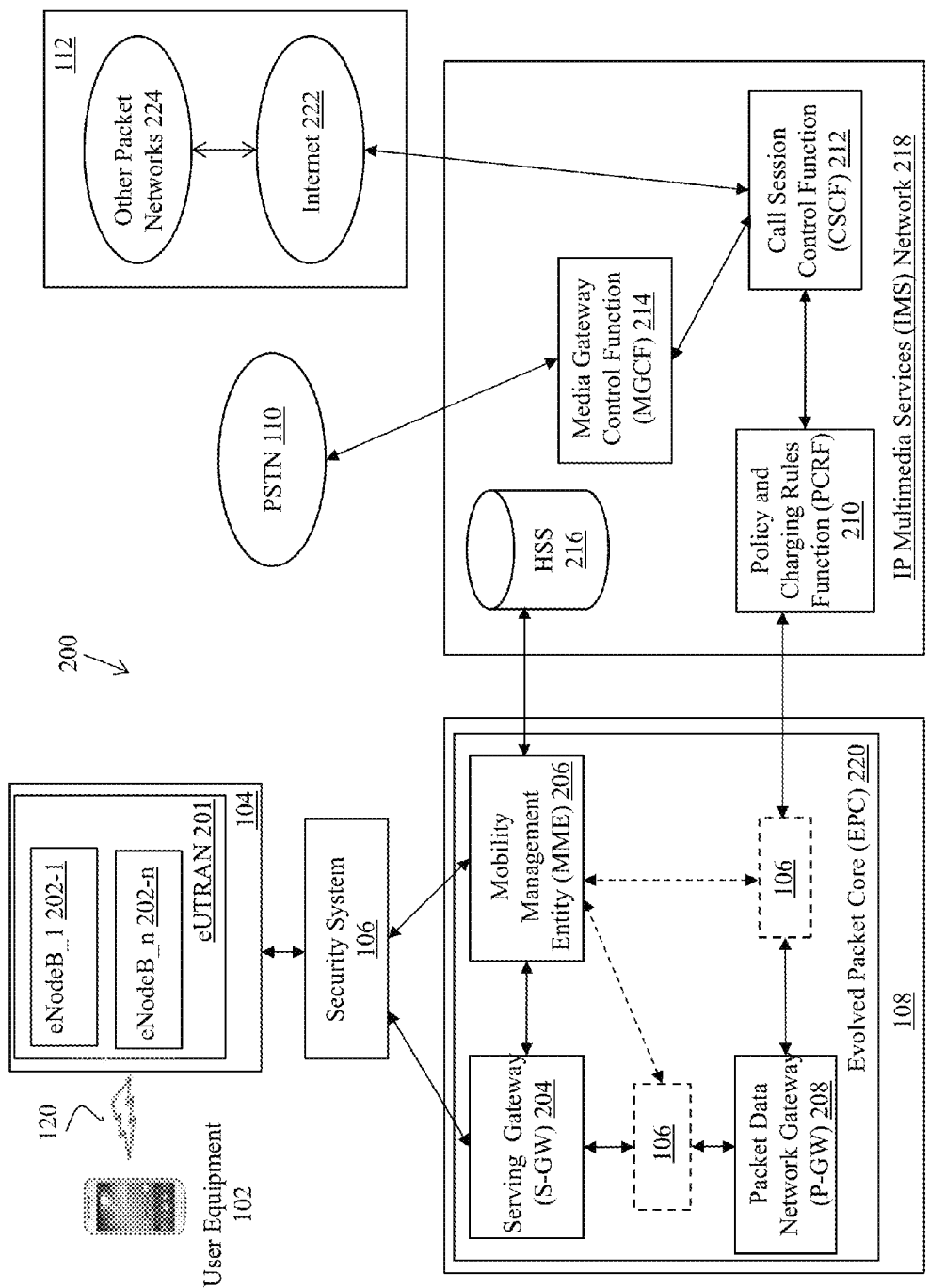
FIG. 2 illustrates an example implementation of the service provider based security system implemented in an example Long Term Evolution (LTE) standard based cellular network, in accordance with example embodiments of the present disclosure.

FIG. 1 illustrates an example operating environment of a service provider based security system, in accordance with example embodiments of the present disclosure; and FIG. 2 illustrates an example implementation of the service provider based security system implemented in an example Long Term Evolution (LTE) standard based cellular network, in accordance with example embodiments of the present disclosure. It is noted that even though the present disclosure describes the implementation and operation of the security system in an LTE standard based cellular network, the teachings of the present disclosure can be applied to other cellular networks, such as 2G networks, 3G networks, 4G networks, and the like; or other appropriate wireless networks wherein service provider based security is beneficial to users of the cellular and/or wireless networks without departing from a broader scope of the present disclosure.

Referring to FIGS. 1-2, the cellular network 100 may include an endpoint device 102 that may be used by an end-user to communicate with the cellular network using wireless services offered by the cellular network 100. The end-user may be an individual user, a group of users, an enterprise or organizational entity, etc. As illustrated in FIG. 2, in an LTE network 200, the endpoint device 102 may be referred to as user equipment. However, in other networks, such as a 2G network, the endpoint device 102 may be referred to as a mobile station. The endpoint device 102 may include all user equipment and software needed for communication with the cellular network 100. Examples of the endpoint device 102 may include, but are not limited to, a smart phone, a cellular phone, a computer or laptop, a computing tablet, or any endpoint communication devices equipped with wireless capabilities. In some example embodiments, the endpoint device 102 of the end-user may include a server, e.g., when the user is transmitting data for storage in a cloud server over the cellular network, or when the user is receiving streaming video content over the cellular network.

The endpoint device 102 may access the wireless services offered by the cellular network 100 via the radio access network 104. In particular, the endpoint device 102 may wirelessly connect with the radio access network 104 over a wireless link 120, and the radio access network 104 may couple the endpoint device 102 to other parts of the cellular network, such as the core network 108. As illustrated in FIG. 2, the radio access network of an LTE network 200 may be an evolved Universal Terrestrial Radio Access Network (eUTRAN) that includes one or more evolved base stations, referred to as eNodeB's (202_1-202_*n*). However, in other example cellular networks, such as 2G or 3G networks, the radio access network 104 may include base stations and/or base station controllers.

The radio access network 104 may transmit all the communication from the endpoint device 102 to the core network 108. The core network 108 of the cellular network 100 may be responsible for the overall control of the actions requested by an endpoint device 102 that is wirelessly connected to the radio access network. For example, the core network 108 may be responsible for processing and routing the traffic (voice and/or data) from the endpoint device 102 to other endpoint devices and/or external networks, such as Internet protocol (IP networks) 112 or public switched telephone network (PSTN) 110. Further, the core network 108 may also handle all the signaling in the control plane. As illustrated in FIG. 2, the core network 108 of an LTE network 200 may be an Evolved Packet Core (EPC) 220 that provides various functions that support wireless services in the LTE environment, e.g., as specified by the 3GPP standards. The EPC network 220 may include at least a serving gateway (S-GW) 204, a packet data network gateway (P-GW) 208, and/or a mobility management entity (MME) 206. It should be noted that the EPC network 220 as shown in FIG. 2 is only illustrative and is not limited to the network elements as described above, i.e., there could be additional network elements that are deployed but not discussed.

The MME 206 is the control node that processes the signaling between the user equipment 102 and the EPC 220 (core network). In particular, the functions of the MME 206 may be categorized as a bearer function, such as, establishment, maintenance and release of the bearers; and/or connection management functions, such as, establishment of the connection and security between the EPC 220 and the user equipment 102. The S-GW 204 may serve as a gateway that routes and forwards user data packets between the eNodeB 202 and the P-GW 208, while also acting as the mobility anchor for the user plane during inter-eNodeB handovers and as the anchor for mobility between LTE and other 3GPP technologies. The P-GW 208 serves as a gateway that provides connectivity between the EPC 220 and other external packet data networks, e.g., Internet 222, IMS network 218, other packet data networks 224, etc., by being the point of exit of traffic.

As illustrated in FIG. 2, in one example embodiment, the P-GW 208 may route the traffic to the Internet 222, other packet data networks 224, and/or the PSTN 110 via the IMS network 218 that includes at least: (1) a home subscriber server (HSS) database 216 that is a central database that contains user-related and subscription-related information about all the network operator's subscribers, (2) a policy and charging rules function (PCRF) element 210, (3) a call session control function (CSCF) element 212, and (4) a media gateway control function (MGCF) element 214.

It should also be noted that the above illustrated cellular network 100 or example LTE cellular network 200 is only illustrative and the number of network components or elements are not specifically limited as shown. Any number of network components or elements can be deployed.

As described above, with the evolution of wireless technology, more and more users are accessing communications services via a mobile device, thereby, resulting in an increase in the flow of Internet traffic through the cellular network. Existing cellular network technology and/or infrastructure is limited in its ability to provide service provider based security services, such as, e.g., validation, authentication, and/or tracking of the data packets in the traffic flowing through the cellular network to: (a) prevent transmission of undesirable or malicious content, such as virus, malware, etc.; (b) prevent the alteration of the data packet payload during transmission; (c) ensure data integrity and thereby, improve quality of service (QoS); and/or (d) track and record users and the devices used by users associated with the data packets transmitted over the cellular network for analytics or to assist law enforcement agencies.

The present disclosure describes a security system 106 that would enable a service provider to provide said service provider based security services to the service provider's customers. In one example embodiment, said service provider based security services may be offered to customers as an upgrade feature for an additional fee. For example, a customer may subscribe to a service provider based security service for an additional fee and register one or more endpoint devices 102. In other example embodiments, said security services may be offered as an inherent service to all the customers of the service provider.

As illustrated in FIGS. 1 and 2, the security system 106 may be disposed in a service provider portion of the cellular network 100. In one example embodiment, the security system 106 may be deployed between the radio access network 104 and the core network 108 such that the security system 106 receives the cellular network traffic before entry into the core network 108. For example, in the LTE network 200 illustrated in FIG. 2, the security system 106 is installed between the eNodeB's (202_1-202_*n*) in the eUTRAN 201 (radio access network 104) and the S-GW 204 of the EPC 220 (core network 108). In particular, in said example embodiment, the security system 106 may be communicatively coupled to the eNodeB's (202_1-202_*n*), the S-GW 204, and the MME 206. Alternatively, as illustrated using dotted lines in FIG. 1, in other example embodiments, the security system 106 may be deployed in the core network 108 of the cellular network 100. For example, as illustrated using dotted lines in FIG. 2, in the LTE network 200, the security system 106 may be installed between the S-GW 204 and the P-GW 208, or between the P-GW 208 and the IMS core network 218. In yet another example embodiment, although not illustrated in the figures, the security system 106 may be deployed in the IMS core network 218 instead of the EPC 220 to intercept the traffic before exiting to external networks, such as the Internet 222, other packet data networks 224 or the PSTN 110.

The security system 106 may monitor cellular network traffic and create and encrypt a digital fingerprint for each data packet in the traffic that carries graphics data. The digital fingerprint may include unique service provider specific information associated with the transmission of the data packet (e.g., sender and/or receiver information, sender and/or receiver endpoint device information, time of transmission, etc.) and at least a portion of the data packet and these pieces of data are cryptographically combined. The encrypted digital fingerprint may then be embedded in the data packet and/or stored in a database for historical records. Additionally, based on identifying the data packets transporting the graphics data, the security system 106 may execute security actions, such as blocking further transmission of the data packet or generating alerts to law enforcement agencies. The security system 106 will be described in greater detail below in association with FIGS. 3-5. In particular, FIGS. 3 and 4 will describe the different elements and components of the security system 106; and FIG. 5 will describe an example method of the security system.

Figure 3:
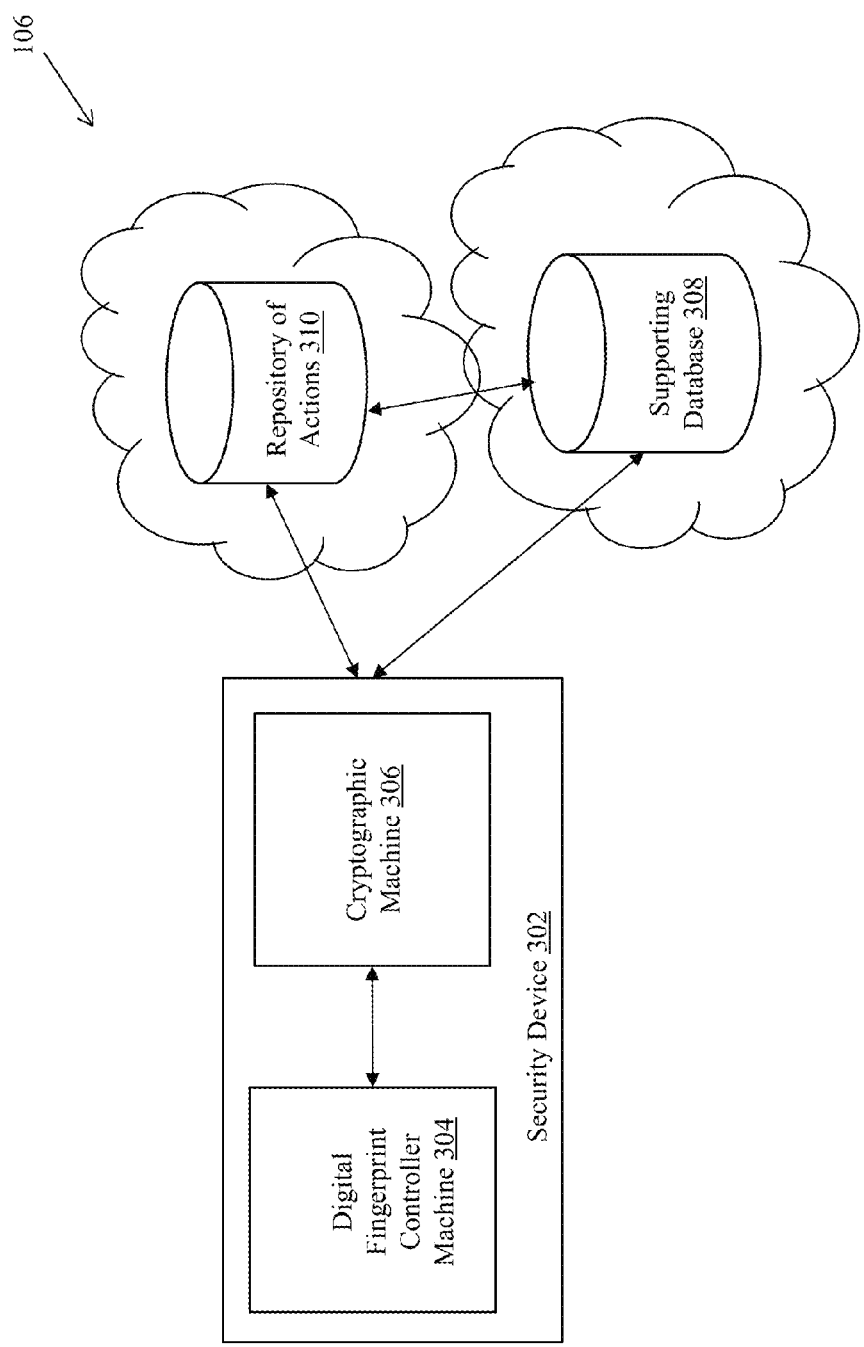
FIG. 3 illustrates example elements of the service provider security system, in accordance with example embodiments of the present disclosure.
Figure 4:
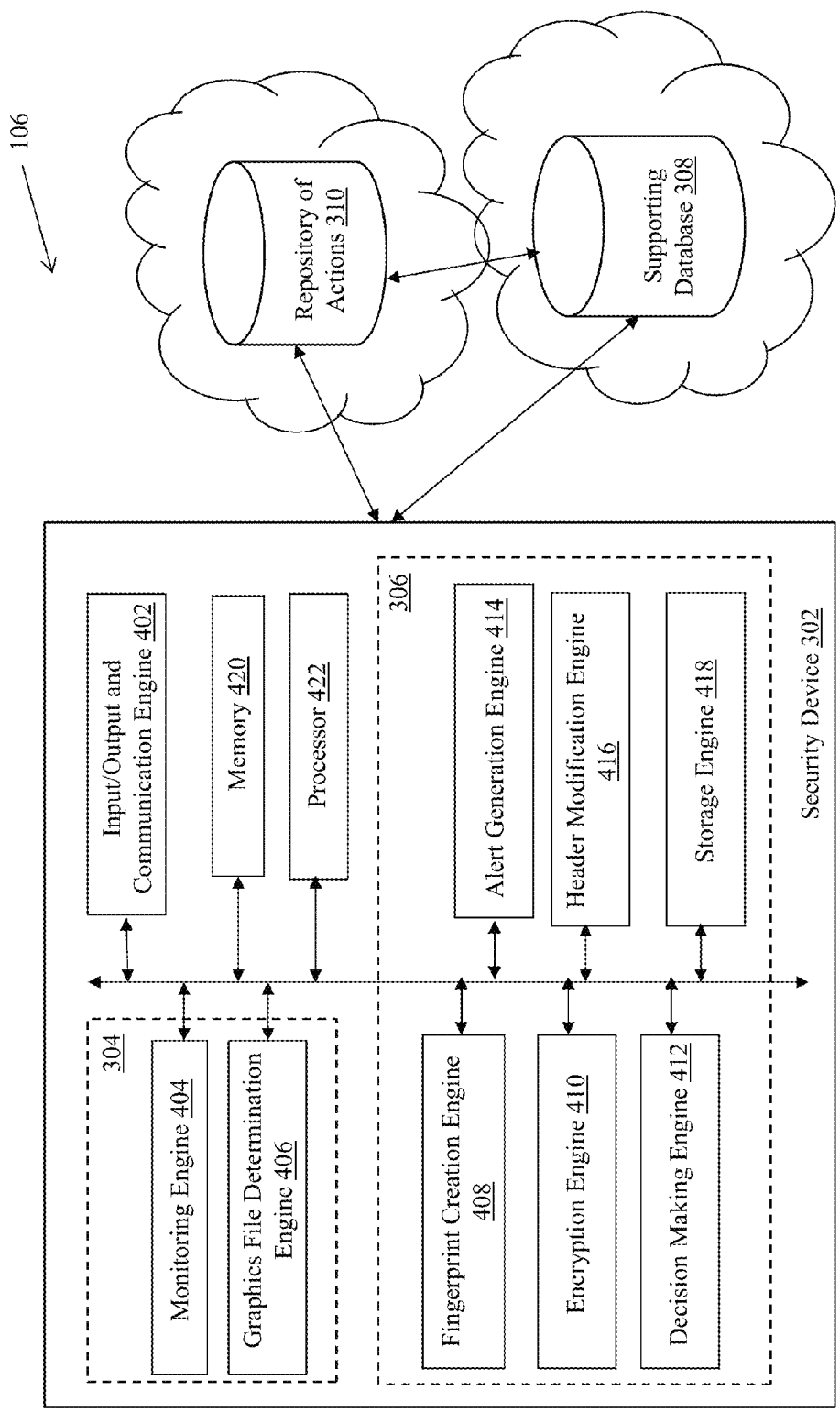
FIG. 4 illustrates a functional block diagram of the security device of the service provider security system of FIG. 3, in accordance with example embodiments of the present disclosure.
Figure 5:
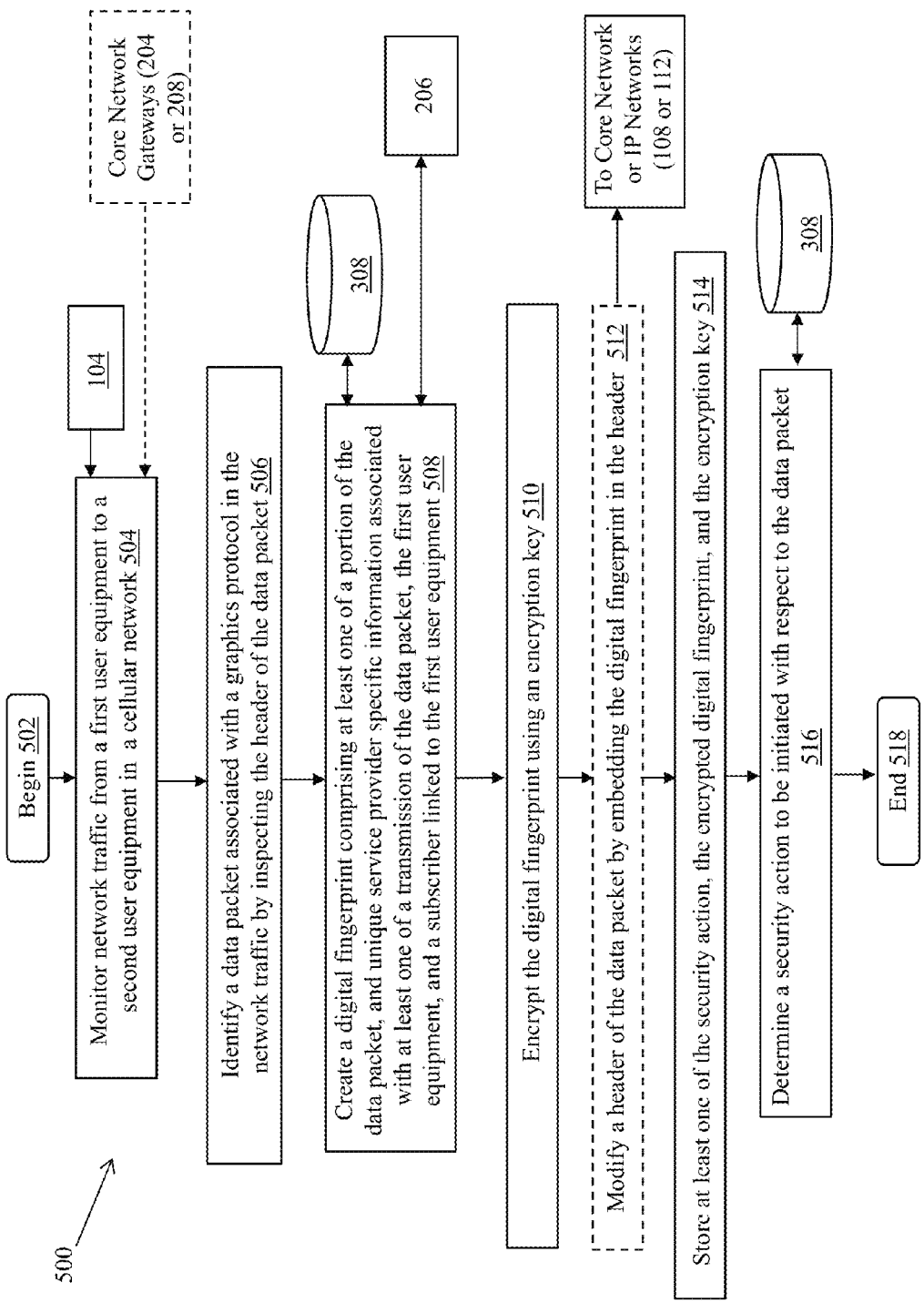
FIG. 5 is a flow chart that illustrates an example method of the service provider security system of FIGS. 3 and 4, in accordance with example embodiments of the present disclosure.

Referring to FIGS. 3-5, the security system 106 may include a security device 302 that is communicably coupled to a supporting database 308 and/or a repository of actions 310 that is remotely located from the security device 302. In some examples, the databases 308 and/or 310 may be cloud based storage mediums. The repository of actions 310 may be coupled to the supporting database 308, and may be accessible by third party analytical entities, law enforcement agencies, and/or other authorized entities to access at least a portion of the data stored in the repository of actions database 310.

In particular, the security device 302 may include a digital fingerprint controller machine 304 and a cryptographic machine 306 that are communicatively coupled to each other. In one example, as illustrated in FIG. 3, the digital fingerprint controller machine 304 and/or the cryptographic machine 306 may be configured as virtual machines that operate on a single host machine. For example, the digital fingerprint controller machine 304 may be configured as a virtual machine operating on the cryptographic machine host computer, or vice-versa. Alternatively, in some example embodiments, both the machines 304 and 306 may be configured as virtual machines. However, one of ordinary skill in the art can understand and appreciate that in other examples, the digital fingerprint controller machine 304 and the cryptographic machine 306 may be configured as separate, standalone, specially configured computing devices that are communicably coupled to each other.

In the example embodiment of FIG. 4 that illustrates a functional block diagram of the security device of the service provider security system of FIG. 3, the security device 302 may include at least an input/output and communications engine 402, a monitoring engine 404, a graphics file determination engine 406, a fingerprint creation engine 408, an encryption engine 410, a decision making engine 412, an alert generation engine 414, a header modification engine 416, a storage engine 418, a memory 420, and a processor 422.

The processor 422 of the security device 302 may be a multi-core processor or a combination of multiple single core processors. The processor 422 may be coupled to the memory 420. The memory 420 may be non-transitory storage medium, in one embodiment, and a transitory storage medium in another embodiment. The memory 420 may include instructions that may be executed by the processor 422 to perform operations of the security device 302. In other words, operations associated with the different engines of the security device 302, e.g., engines 404-418, may be executed using the processor 422.

The input/output and communications engine 402 (herein 'input/output engine 402') of the security device 302 may be configured to enable communication to and from the security device 302. In particular, the input/output engine 402 may receive cellular network traffic from the radio access network 104, e.g., the eNodeB's (202_1-202_n) of the eUTRAN 201 in an LTE network 200, provided the security device 302 is deployed in between the radio access network 104 and the core network 108 of the cellular network 100. Alternatively, if the security device 302 is deployed in the core network 108, e.g., in between the S-GW 204 and the P-GW 208 of the EPC 220, the input/output engine 402 may receive cellular network traffic from the S-GW 204. In yet another example embodiment where the security device 302 is deployed in between the P-GW 208 and the IMS network 218, the input/output engine 402 may receive cellular network traffic from the P-GW 208 prior to exiting the EPC network 220.

One of ordinary skill in the art can understand and appreciate that even though the present disclosure describes the deployment and operation of the security device 302 in an LTE network 200, in other example embodiments, the security device can be deployed and operated in any other appropriate cellular network, such as 2G, 3G, etc., and accordingly, the security device may be coupled to functionally equivalent network elements in said other networks as in the LTE network 200 without departing from a broader scope of the present disclosure.

In addition to receiving the cellular network traffic, the input/output engine 402 of the security device 302 may be configured to receive input from the signaling and mobility control element of the core network 108, e.g., the MME 206. In particular, data received from the MME 206 may include unique service provider specific information for creating the digital fingerprint. Example unique service provider specific information may include, but is not limited to, Universal Subscriber Identity Module (USIM) information, time of transmission of a data packet, or the International Mobile Subscriber Identity/Temporary International Mobile Subscriber Identity (IMSI/TIMSI). In other words, the unique service provider specific information may include any appropriate unique information that is either created, assigned, and/or recorded by the service provider in association with traffic generated by a user's endpoint device 102 to identify the user, the user's endpoint device 102, and/or the traffic from and/or to the user's endpoint device 102.

When the user equipment 102 is turned on and attaches to the LTE network 200, the MME 206 may create a user equipment context and assign a unique short temporary identity termed the SAE Temporary Mobile Subscriber Identity (S-TMSI) to the user equipment that identifies the user equipment context in the MME 206. Further, the MME may also be responsible for security functions associated with signaling and user data. For example, when a user equipment attaches with the network, a mutual authentication of the user equipment and the network is performed between the user equipment and the MME/HSS. Accordingly, the security device 302 may communicate with the MME 206 to receive the unique service provider specific information that is used to create the digital fingerprint. In some example embodiments, in addition to communicating with the MME 206, the security device 302 may communicate with other appropriate databases, such as the supporting database 308, the home subscriber service (HSS) database, etc., to retrieve the unique service provider specific information. In other example embodiments, the MME 206 may communicate with the other appropriate databases and provide the information collected from said databases to the security device 302.

Furthermore, the input/output engine 402 may receive rules stored in the supporting database 308 to assist the security device 102 in determining whether any security actions need to be executed in response to identifying a specific type of data packet in the cellular network traffic, e.g., data packets transporting graphics data. The term 'graphics data' as used herein may refer to any appropriate multimedia data including, but not limited to, images, graphic objects (including drawings, sketches and illustrations), animation sequences, and/or video.

In response to receiving the various inputs described above, the security device 302 may process the received input in a specific manner to generate one or more outputs that may be stored in databases (308 and/or 310) to which the security device 302 is communicably coupled. Example outputs may include, but are not limited to, the encrypted digital fingerprint that is to be stored in the supporting database 308 and/or the repository of actions 310, an encryption key (public key), and alerts generated for law enforcement agencies or other appropriate entities.

Responsive to receiving the cellular network traffic, processing at least one data packet of the received cellular network traffic, and/or generating one or more outputs, the security device 302 may forward the data packets of the cellular network traffic downstream to the next network element of the cellular network for completing a transmission of the data packets, unless a determination is made to execute a security action, such as, block a forward transmission of the data packet to a recipient user.

As illustrated in FIGS. 3 and 4, in addition to the processor 420, memory 422, and the input/output device 402, the security device 302 may include the digital fingerprint controller machine 304 and the cryptographic machine 306. In particular, the digital fingerprint controller machine 304 may be configured to receive the cellular network traffic from the input/output engine 402, where the cellular network traffic comprises data packets transmitted from a sender to a recipient over the cellular network using an endpoint device 102. The cellular network traffic may be received from the eNodeB's 202, the S-GW 204, or the P-GW 208 based on a deployment of the security device 302 within the cellular network 200. In either case, upon receiving the cellular network traffic, the digital fingerprint controller machine 304 is configured to inspect each data packet of the cellular network traffic to identify data packets that transport graphics data. Further, the digital fingerprint controller machine 304 is configured to forward the identified data packets, i.e., data packets transporting graphics data, to the cryptographic machine 306.

Upon receiving the identified data packets from the digital fingerprint controller machine 304, the cryptographic machine 306 operates in concert with the supporting database 308 and/or other appropriate network storage devices and elements to create a digital fingerprint for each identified data packet. The digital fingerprint may include unique service provider specific information and at least a portion of the data packet. The supporting database 308 may be a database that either replicates or has access to unique service provider specific information from other network elements of the cellular network. In one example, the supporting database 308 may include subscriber information for each subscriber of the service provider and/or a roaming user of another service provider. In one example embodiment, only subscribers that have specifically registered and paid for the service provider based security services may be included in the supporting database 308, while in other example embodiments, any paying subscriber of the service provider may be included in the supporting database 308 to avail the service provider based security services.

In addition to the subscriber information, the supporting database 308 may further include a set of rules associated with each subscriber regarding security actions that need to be taken in response to identifying a specific type of data packet being transmitted from the subscriber or transmitted to the subscriber. The rules may either be set by the subscribers (including roaming subscribers) or by other entities, such as service providers, law enforcement agencies, analytics entities, etc. In some example embodiments, the rules may not always be associated with a specific subscriber. Instead or additionally, the rules may be associated with: (a) the service provider, (b) law enforcement agencies or other third party entities, (c) the content of the data packet, (d) the time of transmission, etc. For example, a broad set of rules may be applicable to transmission of any data packet transporting images categorized as adult content irrespective of the sender and/or recipient. Example security actions may include, but are not limited to, blocking data packets, alerting law enforcement agencies, etc.

Responsive to creating the digital fingerprint, the cryptographic machine 306 may encrypt the digital fingerprint and embed the encrypted digital fingerprint in the respective identified data packet. Alternatively or in addition to embedding the encrypted digital fingerprint in the data packet, the cryptographic machine 306 may store the encrypted digital fingerprint, the encryption key (e.g., public key), and/or other relevant information in the repository of actions database 310 and/or supporting database 308. That is, in addition to the subscriber information and the corresponding set of rules, in some example embodiments, the supporting database 308 may also store information associated with the data packets, e.g., source, destination, payload transmitted, protocols used, encryption keys uniquely identifying graphics data, digital fingerprints, etc.

The cryptographic machine 306 may also be configured to determine if the security device 302 is required to execute security actions in response to identifying the data packets transporting graphics data. Said determination may be made by the cryptographic machine 306 with assistance from the set of rules stored in the supporting database 308. Alternatively, in some example embodiments, the cryptographic machine 306 may be able to determine the security actions to be executed in response to identifying a specific data packet type using a machine learning process. Information regarding said security actions may also be stored in the repository of actions 310 and/or the supporting database 308.

The repository of actions database 310 may be a database that stores any appropriate information associated with operations requested and completed on behalf of the subscriber (and/or roaming users). For example, the repository of actions database 310 may store details regarding when a data packet was transmitted from a sender to a recipient, the sender and/or recipient of the data packet, responses from the recipient, etc. Additionally, the repository of actions database 310 may be configured to store digital fingerprints, encryption keys, and/or other relevant information from the security device 302 for historical records. The repository of actions database 310 may be configured for authorized access by commercial applications and other third parties that have interest in the information stored in the repository of actions database 310, such as, law enforcement agencies, analytical entities, application developers, etc.

The various engines of the digital fingerprint controller machine 304 and the cryptographic machine 306 of the security device 302, e.g., engines 404-418, and their specific operations will be described in greater detail below by making reference to FIG. 5 as and when needed. FIG. 5 is a flow chart that illustrates an example method of the service provider security system of FIGS. 3 and 4, in accordance with example embodiments of the present disclosure. Although specific operations are disclosed in the flowcharts illustrated in FIG. 5, such operations are examples. That is, embodiments of the present disclosure are well suited to performing various other operations or variations of the operations recited in the flowcharts. It is appreciated that the operations in the flowcharts illustrated in FIG. 5 may be performed in an order different than presented, and that not all of the operations in the flowcharts may be performed.

All, or a portion of, the embodiments described by the flowcharts illustrated in FIG. 5 can be implemented using computer-readable and computer-executable instructions which reside, for example, in computer-usable media of a computer system or like device. As described above, certain processes and operations of the present disclosure are realized, in one embodiment, as a series of instructions (e.g., software programs) that reside within computer readable memory of a computer system and are executed by the processor of the computer system. When executed, the instructions cause the computer system to implement the functionality of the security system as described below.

Referring to FIGS. 4 and 5, the method 500 of the security system 106 starts in step 502 where the input/output engine 402 of the security device 302 receives the cellular network traffic from a first endpoint device 102 (of a sender end-user) to a second endpoint device (of a recipient end-user) and proceeds to step 504. It is noted even though the description of the method 500 of the security system 106 in FIG. 5 is limited to operations on cellular network traffic between a pair of endpoint devices, one of ordinary skill in the art can understand and appreciate that the security system 106 can similarly receive and operate on cellular network traffic between numerous end-users without departing from a broader scope of the present disclosure.

In operation 504, the input/output engine 402 forwards the cellular network traffic to the monitoring engine 404 of the digital fingerprint controller machine 304 which in turn monitors each data packet of the received cellular network traffic and operates in concert with the graphics file determination engine 406 in operation 506 to identify a data packet associated with a graphics protocol, i.e., a data packet transporting a graphics file. In particular, in one example embodiment, the graphics file determination engine 406 may inspect the packet header of each received data packet to identify whether the data packet is transporting graphics data payload. In another example embodiment, in addition to or instead of inspecting the packet header, the graphics file determination engine 406 may inspect the payload of the data packet, e.g., a deep packet inspection, to identify whether the data packet is transporting graphics data payload.

Further, as described above in association with FIGS. 3 and 4, the cellular network traffic may be received from the radio access network 104 and/or an appropriate element of the core network 108 (e.g., gateways (204, 208)) based on how the security system is deployed in the cellular network 100.

Responsive to identifying a data packet associated with a graphics protocol, the graphics file determination engine 406 forwards the identified data packet to the fingerprint creation engine 408 of the cryptographic machine 306 which in turn operates in concert with the supporting database 308, the signaling and/or mobility control element, such as MME 206, and/or other relevant databases and elements of the cellular network 100 in operation 508 to create a digital fingerprint. The digital fingerprint may include: (a) unique service provider specific information associated with at least one of a transmission of the identified data packet, the endpoint devices, and users linked to the endpoint devices, and/or (b) at least a portion of the data packet.

In particular, in operation 508, the fingerprint creation engine 408 may: (1) retrieve a sender and receiver identification from the identified data packet, e.g., source and/or destination Internet Protocol (IP) address, (2) communicate the retrieved sender and/or receiver identification with the supporting database 308, the MME 206, and/or other relevant network elements and databases to receive unique service provider specific information associated with the transmission of the identified data packet, the end-users, the end-users' end-point devices, etc. As described above in association with FIGS. 1-4, the unique service provider specific information may include, but is not limited to, USIM information, time/date stamp, IMSI/TIMSI, IMEI, etc. That is, broadly defined, the unique service provider specific information provides information regarding who sent the data packet to whom, using which specific device, at what time, etc. Further, in operation 508, the fingerprint creation engine 408 may retrieve at least a portion of header information from the packet header of the identified data packet. For example, the fingerprint creation engine 408 may retrieve sender IP address, receiver IP address, etc.

Further, in one example, upon retrieving the portion of the header data from the identified data packet's header and the unique service provider specific information, in operation 508, the fingerprint creation engine 408 may cryptographically combine the portion of the header data and the unique service provider specific information to create the digital fingerprint, also referred to as a cryptographic key. For example, the fingerprint creation engine 408 may provide the portion of the header data and the unique service provider specific information as input to a hashing function/algorithm, such as MD5, SHA, etc., which in turn generates the digital fingerprint, i.e., the hash of the input data. In some example embodiments, the hash function/algorithm may be selected based on the size of the graphics data transported by the identified data packet.

In another example, in operation 508, instead of creating a digital fingerprint comprising both the portion of the header data and the unique service provider specific information, the fingerprint creation engine 408 may create the digital fingerprint using only the portion of the header data. In said example embodiment, the unique service provider specific information may be transmitted along with the digital fingerprint comprising the portion of the data header for storage in a database. For example, the digital fingerprint may be stored in a database and associated with the corresponding unique service provider specific information in the database. This enables a user to easily query the specific digital fingerprint using the unique service provider specific information as a query parameter or key word.

In yet another example, in addition to the portion of the header data and the unique service provider specific information, the digital fingerprint may include at least a portion of the payload of the data packet, e.g., the graphics data. Alternatively, in another example, the digital fingerprint may include only the unique service provider specific information. In either case, responsive to creating the digital fingerprint, the method 500 proceeds to operation 510.

In operation 510, the fingerprint creation engine 408 may transmit the digital fingerprint to and operate in concert with the encryption engine 410 to encrypt the digital fingerprint. In one example embodiment, an AES 256 encryption mechanism may be used to encrypt the digital fingerprint. However, in other example embodiments, any other appropriate encryption mechanism may be used without departing from a broader scope of the present disclosure. Further, in some example embodiments, the encryption key used to encrypt the digital fingerprint may be determined based on the type of graphics data, length of graphics data, or any other appropriate data in the data packet. In particular, the digital fingerprint may be encrypted using a private key and the public key may be stored in the supporting database 308 and/or the repository of actions database 310 for access by authorized users.

Responsive to encrypting the digital fingerprint, in operation 512, the fingerprint creation engine 408 and the encryption engine 410 may operate in concert with the header modification engine 416 to modify the identified data packet by embedding the encrypted digital fingerprint in the packet header of the identified data packet. It is noted that operation 512 is an optional step and may be omitted in some example embodiments. However, embedding the encrypted digital fingerprint in the packet header allows downstream network elements of the cellular network, backend servers, or other external networks to retrieve the encrypted digital fingerprint, decrypt it using the public key, and compare it with a digital fingerprint created by the downstream network elements to ensure that the data packet and/or the graphics data transported by the data packet has not been altered, thereby improving a quality of service (QoS). In another example, the header modification engine 416 may embed the digital fingerprint in the packet header of the identified data packet without encrypting the digital fingerprint. Further, in operation 512, said modified data packet comprising the digital fingerprint (encrypted or not encrypted) may be forwarded to the core network 108, the next network element in the core network 108, or the external networks based on a deployment of the security system 106 in the cellular network 100.

In addition to embedding the digital fingerprint (encrypted or not encrypted) in the packet header of the identified data packet, in operation 514, the header modification engine 416 and/or the encryption engine 410 may operate in concert with the storage engine 418 to store the encrypted digital fingerprint in the repository of actions database 310 and/or the supporting database 308. Additionally, unique service provider specific information, the encryption key (public), and/or other relevant information associated with any appropriate actions requested and completed by the security system 106 on behalf of the end-users may be stored along with the encrypted digital fingerprint in the repository of actions database 310 for historical recording and/or further access by authorized users.

Additionally, in operation 516, the decision making engine 412 of the cryptographic machine 306 may operate in concert with the supporting database to determine additional security actions that are to be executed in association with identifying the data packet transporting the graphics data. The determination step of operation 516 may be assisted by information from the supporting database 308 comprising a set of rules associated with each subscriber, type of data packet, time of transmission, etc. For example, the decision making engine 412 may determine that all data packets transporting graphics files from a subscriber transmitted between 7 pm-7 am should be blocked. In another example, the set of rules may instruct the security device 302 to generate an alert to law enforcement agencies upon identifying a data packet transporting graphics data that is R-rated. Accordingly, the decision making engine 412 may operate in concert with the alert generation engine 414 to generate an alert and transmit the alert through the input/output engine 402 to one or more law enforcement agencies over the cellular network or other appropriate communication networks. Said additional security actions and information associated with such additional security actions may also be stored by the storage engine 408 in the repository of actions database 310. In another example embodiment, the decision making engine 412 may determine the additional security actions based on a machine learning process where the decision making engine 412 learns the data packet information, the type of graphics data transported by the data packets, etc., and automatically identifies the additional security actions to be executed based on previous learning and correspondingly generate learning models. The method 500 then proceeds to operation 518 to end the process.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims.

What is claimed is:

1. A method comprising:
    monitoring, at a security device deployed in a cellular network, network traffic from a first endpoint device that is in communication with the cellular network;
    identifying, by the security device, a data packet in the network traffic, the data packet associated with a graphics protocol;
    determining, by the security device, a security action to be executed in association with the data packet;
    creating, by the security device, a digital fingerprint comprising a portion of the data packet and unique service provider specific information associated with one of a transmission of the data packet, the first endpoint device, and a subscriber of the first endpoint device;
    encrypting, by the security device, the digital fingerprint using an encryption key to create an encrypted digital fingerprint; and
    storing, by the security device, the encrypted digital fingerprint and the encryption key in a repository of actions database coupled to the security device,
    wherein the security action comprises generating and transmitting an alert.

2. The method of claim 1, wherein the step of creating the digital fingerprint further comprises:
    determining, by the security device, an identifier associated with one of a source and a destination of the data packet from a header of the data packet;

retrieving, by the security device, the unique service provider specific information from one of a supporting database and a signaling and control element of the cellular network, wherein the supporting database and the signaling and control element are communicably coupled to the security device;

retrieving, by the security device, packet data from one of the header and a payload of the data packet; and cryptographically combining, by the security device, one of the packet data and the unique service provider specific information to form the digital fingerprint using a hashing algorithm.

3. The method of claim 2, wherein the identifier associated with the source and the destination of the identified data packet comprises an Internet Protocol address.

4. The method of claim 1, wherein the step of identifying the data packet associated with the graphics protocol comprises:

inspecting, by the security device, a header of the data packet; and determining, by the security device, that a payload of the data packet comprises graphics data based on data from the header of the data packet.

5. The method of claim 1, further comprising:

modifying, by the security device, a header of the identified data packet by adding the encrypted digital fingerprint to the header of the data packet.

6. The method of claim 1, wherein the security action comprises blocking a forward transmission of the identified data packet.

7. The method of claim 1, wherein the security device is deployed between a radio access network and a core network of the cellular network, wherein the security device is communicably coupled to a base station node of the radio access network.

8. The method of claim 1, wherein the security device is deployed in a core network of the cellular network, and wherein the security device is communicably coupled to a gateway of the core network.

9. A tangible non-transitory computer-readable medium comprising a plurality of instructions, which, when executed by a security device deployed in a cellular network, cause the security device to perform operations for providing a service provider based security service in the cellular network, the operations comprising:

monitoring network traffic from a first endpoint device that is in communication with the cellular network;

identifying a data packet in the network traffic, the data packet associated with a graphics protocol;

determining a security action to be initiated in association with the data packet;

creating a digital fingerprint comprising a portion of the data packet and unique service provider specific information associated with one of a transmission of the data packet, the first endpoint device, and a subscriber of the first endpoint device;

encrypting the digital fingerprint using an encryption key to create an encrypted digital fingerprint;

modifying a header of the data packet by adding the encrypted digital fingerprint to the header of the data packet; and storing the encrypted digital fingerprint and the encryption key in a repository of actions database coupled to the security device, wherein the security action comprises generating and transmitting an alert.

10. The tangible non-transitory computer-readable medium of claim 9, wherein the step of identifying the data packet associated with the graphics protocol comprises:

inspecting, by the security device, the header of the data packet; and determining, by the security device, that a payload of the data packet comprises graphics data based on data from the header of the data packet.

11. The tangible non-transitory computer-readable medium of claim 9, wherein the security device is deployed between a radio access network and a core network of the cellular network, wherein the security device is communicably coupled to a base station node of the radio access network.

12. The tangible non-transitory computer-readable medium of claim 9, wherein the security device is deployed in a core network of the cellular network, and wherein the security device is communicably coupled to a gateway of the core network.

13. The tangible non-transitory computer-readable medium of claim 9, wherein the step of creating the digital fingerprint further comprises cryptographically combining, by the security device, one of packet data retrieved from a portion of the data packet and the unique service provider specific information to form the digital fingerprint using a hashing algorithm.

14. The tangible non-transitory computer-readable medium of claim 9, wherein the unique service provider specific information comprises one of Universal Subscriber Identity Module information, a time of transmission of the data packet, and an International Mobile Subscriber Identity/Temporary International Mobile Subscriber Identity.

15. A security device for providing a service provider based security service in a cellular network comprising:

a processor;

a digital fingerprint controller machine;

a cryptographic machine; and a memory, the memory comprising instructions which when executed by the processor, cause the security device to perform operations, the operations comprising:

monitoring network traffic from a first endpoint device that is in communication with the cellular network;

identifying a data packet in the network traffic, the data packet associated with a graphics protocol;

determining a security action to be initiated in association with the data packet;

creating a digital fingerprint comprising a portion of the data packet and unique service provider specific information associated with one of a transmission of the data packet, the first endpoint device, and a subscriber of the first endpoint device;

encrypting the digital fingerprint using an encryption key to create an encrypted digital fingerprint; and storing one of the encrypted digital fingerprint and the encryption key in a repository of actions database coupled to the security device, wherein the security action comprises generating and transmitting an alert.

16. The security device of claim 15, wherein the operations further comprise:

modifying a header of the data packet by adding the encrypted digital fingerprint to the header of the data packet.

17. The security device of claim 15, wherein the security device is deployed in the cellular network.

18. The security device of claim 17, wherein the security device is deployed between a radio access network and a core network of the cellular network, wherein the security device is communicably coupled to a base station node of the radio access network.

19. The security device of claim 17, wherein the security device is deployed in a core network of the cellular network, and wherein the security device is communicably coupled to a gateway of the core network.

* * * * *